(12) United States Patent
Limatibul

(10) Patent No.: US 10,773,499 B2
(45) Date of Patent: Sep. 15, 2020

(54) MULTILAYERD FLEXIBLE SHEET WITH HIGH SPECULAR GLOSS

(71) Applicant: KIMPAI LAMITUBE CO., LTD., Bangkok (TH)

(72) Inventor: Sumet Limatibul, Bangkok (TH)

(73) Assignee: KIM PAI LAMITUBE CO., LTD., Bangkok (TH)

( * ) Notice: Subject to any disclaimer, the term of this patent is extended or adjusted under 35 U.S.C. 154(b) by 184 days.

(21) Appl. No.: 16/088,692

(22) PCT Filed: Sep. 1, 2016

(86) PCT No.: PCT/TH2016/000074
§ 371 (c)(1),
(2) Date: Sep. 26, 2018

(87) PCT Pub. No.: WO2017/204752
PCT Pub. Date: Nov. 30, 2017

(65) Prior Publication Data
US 2019/0077128 A1   Mar. 14, 2019

(30) Foreign Application Priority Data

May 26, 2016   (TH) ................................ 1601003059

(51) Int. Cl.
| | | |
|---|---|---|
| *B32B 27/08* | (2006.01) | |
| *B32B 7/12* | (2006.01) | |
| *B32B 27/32* | (2006.01) | |
| *B32B 27/36* | (2006.01) | |
| *B32B 27/30* | (2006.01) | |

(52) U.S. Cl.
CPC ................ *B32B 27/08* (2013.01); *B32B 7/12* (2013.01); *B32B 27/306* (2013.01); *B32B 27/32* (2013.01); *B32B 27/36* (2013.01); *B32B 2250/05* (2013.01); *B32B 2255/10* (2013.01); *B32B 2255/205* (2013.01); *B32B 2307/406* (2013.01); *B32B 2323/046* (2013.01); *B32B 2439/70* (2013.01); *B32B 2439/80* (2013.01)

(58) Field of Classification Search
CPC .......... B32B 27/08; B32B 7/12; B32B 27/32; B32B 27/36; B32B 27/306; B32B 2439/80; B32B 2255/10; B32B 2307/406; B32B 2250/05; B32B 2323/046; B32B 2439/70

See application file for complete search history.

(56) References Cited

U.S. PATENT DOCUMENTS

2012/0196141 A1   8/2012   Pocius

FOREIGN PATENT DOCUMENTS

| CN | 1760087 A | 4/2006 |
|---|---|---|
| CN | 104354427 A | 2/2015 |
| JP | 7-257609 A | 10/1995 |
| JP | 3012000 B2 | 12/1999 |
| WO | 2009/087659 A2 | 7/2009 |

OTHER PUBLICATIONS

International Search Report (ISR) and Written Opinion (WO) dated Mar. 2, 2017 for International Application No. PCT/TH2016/000074.
espacenet English abstract of CN 104354427 A.
espacenet English abstract of CN 1760087 A.
espacenet English abstract of JP 7-257609 A.
espacenet English abstract of JPH04201332 A which corresponds to JP 3012000 B2.

*Primary Examiner* — Michael C Miggins
(74) *Attorney, Agent, or Firm* — Ladas & Parry LLP

(57) ABSTRACT

A laminated tubular container is made of a laminated sheet comprising an evaporated film with an evaporated side made of a metal, metal-oxide or an inorganic substance, wherein the evaporate side of the evaporated film is adhesive-laminated with linear low-density polyethylene by using an adhesive agent and is laminated with an adhesive agent and is laminated with another linear low-density polyethylene layer, while the other side of such evaporated film is laminated with films selected from the group consisting of polyethylene, an aluminium foil, a copolymer of ethylene and vinyl alcohol, and any combinations thereof. This invention relates to a laminated tubular package capable of packaging contents, such as liquid or creamy cosmetic products and toothpastes.

20 Claims, No Drawings

MULTILAYERD FLEXIBLE SHEET WITH HIGH SPECULAR GLOSS

RELATED APPLICATION

This application is an application under 35 U.S.C. 371 of International Application No. PCT/TH2016/000074 filed on May 26, 2016, the entire contents of which are incorporated herein by reference.

FIELD OF THE INVENTION

The present invention is in the field of materials science and relates to a multilayered flexible sheet with high specular gloss.

BACKGROUND ART

A tubular package comprises a film laminated with a plastic layer containing aluminium foils having excellent gas and water-vapor barrier properties. The said tubular container with the aluminium barrier laminate has the luster effects of the aluminium films. The objective of the invention is to provide a laminated tubular package with high luster effects and oxygen-gas and water-vapor barrier properties.

Besides the aluminium foils, a metallized polymer film such as polyethylene terephthalate as one of packaging films is used in a multilayered laminated sheet in order to obtain excellent oxygen and water-vapor barrier.

Japanese patent application No. 1994-057037 discloses a resilient laminated tubular container made of a laminated film comprising an evaporated film with an evaporated side made of a metal, metal oxide or an inorganic substance, wherein the evaporated side of the evaporated film is adhesive-laminated with linear low-density polyethylene (LLDPE) by an adhesive agent, and then laminated with another LLDPE layer, while the other side of the said evaporated film is laminated with films consisting of polyethylene, a white ethylene vinyl acetate copolymer (EVA), and polyethylene layers.

Japanese patent No. 3012000 discloses a laminated material for a tubular container comprising: at least an intermediate supporting layer; an outermost layer made of a thermoplastic resin film disposed on the outer side of the said intermediate supporting layer; an innermost layer made of a thermoplastic resin film disposed on the inner side of the said intermediate supporting layer; and a barrier layer disposed between the said innermost layer and said intermediate supporting layer, wherein the said intermediate layer comprises a print layer covering at least one side of a biaxially-stretched resin film layer, and a metallic film disposed on the inner side of the said biaxially-stretched resin film layer and located further inside the said print layer.

Patent application PCT/IN2008/000758 discloses a multilayer flexible sheet comprising: metalizing at least one of the surfaces of a core polymer layer; priming the metalized surface of the core polymer with a primer; extrusion laminating the primed surface of the core polymer layer with polyolefin and/or a co-polymer of polyolefin; and co-extruding a first heat sealable layer over the extrusion laminated layer. The multilayer polymer sheet at least comprises a core layer having one of the polymer sides plasma-treated, a metal layer deposited on the plasma-treated side of the core layer, a primer layer applied, on the metalized surface of the core layer, an extrusion polymer lamination layer of polyolefin and/or a copolymer of polyolefin, and a heat sealable layer on the extrusion polymer lamination layer.

SUMMARY OF THE INVENTION

A laminated tubular container is made of a laminated sheet comprising an evaporated film with an evaporated side made of a metal, metal-oxide or an inorganic substance, wherein the evaporate side of the evaporated film is adhesive-laminated with linear low-density polyethylene by using an adhesive agent and is laminated with another linear low-density polyethylene layer, while the other side of such evaporated film is laminated with films selected from the group consisting of polyethylene, an aluminium foil, a copolymer of ethylene and vinyl alcohol, and any combinations thereof. This invention relates to a laminated tubular package capable of packaging contents, such as liquid or creamy cosmetic products and toothpastes.

DETAILED DESCRIPTION

The invention described herein relates to a laminated sheet with high specular gloss having various total thicknesses in the range of 240-440 microns. In one embodiment of the laminated sheet, a metalized polyester laminate has high specular gloss (>700 GU). Firstly, the metalized polyester is adhesive-laminated with polyethylene films. Thereafter, this part is further laminated with materials selected from the group consisting of an aluminium foil or an inner film by co-extrusion lamination of hot-melted resins of an ethylene vinyl alcohol copolymer (EVOII), a tie, LLDPE, an ethylene acrylic acid copolymer (EAA), or any combinations thereof.

In one embodiment, invention provides a laminated sheet with high specular gloss comprising the following layers:
  a first layer which is an outer polyethylene layer;
  a second layer which is an evaporated film layer made of a metallized base film;
  a third layer which is a polyethylene layer;
  a fourth layer which is a multilayered film layer comprising at least one ethylene-vinyl alcohol copolymer layer and at least one polyethylene layer, wherein at least one layer of the ethylene-vinyl alcohol copolymer is tied to at least one layer of the said polyethylene by a tie; and
  a fifth layer which is an inner polyethylene layer,
  wherein the first to fifth layers are adhered together by means of adhesion or co-extrusion,
  wherein the first layer and the third layer may be a single layer or multiple layers comprising polyethylene selected from the group consisting of LDPE, LLDPE, HDPE, and any mixtures thereof, and the first layer and the third layer may have thicknesses of 45-60 microns.

In the second layer, the metallized base film is polyester or polyethylene terephthalate subjected to metallization, such that a metal layer selected from the group consisting of aluminium, chrome, aluminium oxide, and silicon oxide is formed on the base film layer, and the second layer has a thickness of 12-20 microns.

The first layer is adhesive-laminated with the metal side of the second layer, and the third layer is adhesive-laminated with the film side of the second layer, while the fifth layer is adhesive-laminated with the LLDPE side of the fourth layer, and the third layer is adhesive-laminated with the LLDPE side of the fourth layer.

The fourth layer comprises the following layers:

layer A which is an extruded LLDPE layer having a thickness of 15-35 microns, wherein the LLDPE has a density of 0.903-0.945 g/cc;

layer B which is a tie layer having a thickness of 15-40 microns;

layer C which is an ethylene-vinyl alcohol copolymer layer having a thickness of 10-25 microns, wherein the ethylene-vinyl alcohol copolymer has an amount of ethylene in the range of 27 to 48%;

layer D which is a tie layer having a thickness of 15-40 microns, wherein the tie selected from the group consisting of anhydride-modified, low-density polyethylene resins, and linear low-density polyethylene resins containing anhydride; and layer E which is an extruded LLDPE layer having a thickness of 15-35 microns, wherein the LLDPE has a density of 0.903-0.945 g/cc, and wherein the fifth layer which is the inner polyethylene layer may be a single layer or multiple layers comprising polyethylene selected from the group consisting of LDPE, LLDPE, HDPE, and any mixtures thereof, and has a thickness of 70-120 microns.

The evaporated metal layer on the film is formed by evaporation of either of a metal, metal oxide, or an inorganic substance on the base film made of polyethylene terephthalate, (PET) having a thickness of 10-25 microns using a vapor deposition method. Besides the metal, metal oxide or inorganic material used for the vapor deposition, aluminium, chrome, aluminium oxide, and silicon oxide are also used. These substances may be used as the vapor deposited on the base film by any available methods, such as vacuum deposition, ion plating, sputtering, plasma deposition, etc. Chemical treatment may be applied prior to the metallization in order to improve bonding or so called "metal adhesion" between a metal and PET.

The aluminium, chrome, aluminium oxide, and silica are used as substances for deposition. Optionally, the deposited film may be formed by a method, such as a vacuum deposition method, an ion plating method, a sputtering method, and a plasma treatment method.

The metal layer in the metalized polyester is applied to an optical density from 1.5 to 3.0 min by using a densitometer. The optical density is absorption measurement of visible light and is determined by a standard technique. To calculate the optical density, a commercial densitometer may be used, such as Tobias Densitometer. The densitometer is set to be zero when no film specimen is presented. A film specimen is placed over the aperture plate of the densitometer with the test surface facing upwards. A probe arm is pressed down and the resulting optical density value is recorded.

In this invention, the polyethylene film is adhesive-laminated by using an adhesive agent on the top or the bottom of the said evaporated layer of the polyester film. Depending on printing artwork such as surface or reverse printing, the adhesive-lamination may be performed on the metal side or the plastic side of the polyester film, wherein a type of the adhesive agent used in this process is usually made of two-component polyurethane, or any suitable adhesion methods known in this art.

In this invention, the adhesive-laminated multilayered mPET film is further laminated with a polyethylene film using a molten copolymer of ethylene and vinyl alcohol (EVOH), a tie, LLDPE by means of co-extrusion lamination. The co-extrusion lamination in this step is performed in order as follows: LLDPE/tie/EVOH/tie/LLDPE. While the LLDPE may be replaced with low density polyethylene (LDPE) or the mixture of LLDPE and LDPE, five-layered co-extrusion lamination is maintained in terms of resilience. The thickness of the tie layers and LLDPE layers on both sides may be the same or different, but a good example of thicknesses of the LLDPE layer and the tie layer are about 30 and 15 μm, respectively.

Preferably, the thickness of the inner PE film is approximately 50-100 μm, and the thickness of the outer PE film is approximately 50-100 μm. The outer film is usually in the form of a multilayered blown film such as a three-layerd film in order to obtain several film performances, such as transparency, toughness, hardness, and sealability. The inner film with a multilayered blown film is usually used in order to obtain various features such as toughness, heat-seal performance.

The base film of the deposited film layer used in this invention is polyethylene terephthalate (PET), and biaxial oriented polyester (BOPET). The thickness of the base film may be in the range of 10-25 microns.

The adhesive agent used for the adhesive-lamination includes polyester resins, or polyether-based polyurethane resins, and acrylic resins, such as acrylic acid alkyl ester, and methacrylic acid alkyl ester. An amount of the adhesive coated is in the range of 2-10 $g/m^2$ and preferably 1-8 $g/m^2$. Suitable solvents include aromatic hydrocarbons, alcohols, acetates, esters, and halogen-containing hydrocarbons.

The tie layer used in this invention is anhydride-modified, low-density polyethylene resins, or linear low-density polyethylene resins containing anhydride.

The EVOH used in this invention is ethylene-vinyl alcohol copolymers having an amount of ethylene in the range of 27 to 48%.

In one embodiment, the invention provides a laminated sheet with high specular gloss comprising the following layers:

a first layer which is an outer polyethylene layer;

a second layer which is a film layer comprising at least one LLDPE layer and at least one EAA layer;

a third layer which is an evaporated film layer made of a metallized base film;

a fourth layer which is a polyethylene layer;

a fifth layer which is a multilayered film layer comprising at least one ethylene-vinyl alcohol copolymer layer and at least one polyethylene layer, wherein at least one layer of the ethylene-vinyl alcohol copolymer is tied to at least one layer of the said polyethylene layer a tie; and a sixth layer which is an inner polyethylene layer, wherein the first to sixth layers are adhered together by means of adhesion or co-extrusion.

The first layer and the fourth layer may be a single layer or multiple layers comprising polyethylene selected from the group consisting of LDPE, LLDPE, HDPE, and any mixtures thereof, and the first layer and the fourth layer have thicknesses of 45-60 microns.

In the second layer, the LLDPE layer has a thickness of 15-35 microns, and the LLDPE has a density of 0.903-0.945 g/cc, and the EAA layer has a thickness of 12-30 microns. The first layer is adhered to the LLDPE side of the second layer.

In the third layer, the metallized base film is polyester or polyethylene terephthalate subjected to metallization, such that a metal layer selected from the group consisting of aluminium, chrome, aluminium oxide, and silicon oxide is formed on the base film layer. The third layer has a thickness of 12-20 microns.

The fourth layer is adhesive-laminated with the film side of the third layer, while the first layer is adhesive-laminated with the metal side of the third layer.

The fifth layer comprises the following layers:
- layer A which is an extruded LLDPE layer having a thickness of 15-35 microns, wherein the LLDPE has a density of 0.903-0.945 g/cc;
- layer B which is a tie layer having a thickness of 15-40 microns;
- layer C which is an ethylene-vinyl alcohol copolymer layer having a thickness of 10-25 microns, wherein the ethylene-vinyl alcohol copolymer has an amount of ethylene in the range of 27 to 48%; and
- layer D which is a tie layer having a thickness of 15-40 microns, wherein the tie selected from the group consisting of anhydride-modified, low-density polyethylene resins, and linear low-density polyethylene resins containing anhydride.

The sixth layer which is the inner polyethylene layer may be a single layer or multiple layers comprising polyethylene selected from the group consisting of LDPE, LLDPE, HDPE, and any mixtures thereof, and has a thickness of 70-120 microns. The sixth layer is adhered to the tie side of the fifth layer.

In one embodiment of this invention, there is provided a laminated sheet with high specular gloss comprising the following layers:
- a first layer which is an outer polyethylene layer;
- a second layer which is an evaporated film layer made of a metallized base film;
- a third layer which is a layer comprising at least one EAA layer and at least one metal foil layer;
- a fourth layer which is a LLDPE layer having a thickness of 15-35 microns, and the LLDPE has a density of 0.903-0.945 g/ee; and
- a fifth layer which is an inner polyethylene layer, wherein the first to fifth layers are adhered together by means of adhesion or co-extrusion.

The first layer and the fifth layer may be a single layer or multiple layers comprising polyethylene selected from the group consisting of LDPE, LLDPE, HDPE, and any mixtures thereof, and the first layer and the fifth layer have thicknesses of 40-60 microns and 50-100 microns, respectively.

In the second layer, the metallized base film is polyester or polyethylene terephthalate subjected to metallization, such that a metal layer selected from the group consisting of aluminium, chrome, aluminium oxide, and silicon oxide is formed on the base film layer. The second layer has a thickness of 12-20 microns.

The first layer is adhesive-laminated with the metal side of the second layer, while the EAA side of the third layer is adhesive-laminated with the film side of the second layer, and the EAA side of the third layer is adhesive-laminated with the fourth layer.

The third layer comprises the following layers:
- a first layer which is an EAA layer having a thickness of 12-30 microns,
- a second layer which is an aluminium foil layer having a thickness of 12-20 microns, and
- a third layer which is an EAA layer having a thickness of 12-30 microns.

The EAA used in this invention is a copolymer of ethylene and acrylic acid or methacrylic acid commonly made with 7-9 wt % acrylic acid or 4-9 wt % methacrylic acid.

A thickness of the aluminium foil may be selected to be in the range of 10 to 20 microns.

In one embodiment of this invention, there is provided a laminated sheet with high specular gloss comprising the following layers:
- a first layer which is an outer polyethylene layer;
- a second layer which is a film layer comprising at least one LLDPE layer and at least one EAA layer;
- a third layer which is an evaporated film layer made of a metallized base film;
- a fourth layer which is a polyethylene layer;
- a fifth layer which is a film layer comprising at least one LLDPE layer, at least one EAA layer, and at least one metal foil layer; and
- a sixth layer which is an inner polyethylene layer, wherein the first to sixth layers are adhered together by means of adhesion or co-extrusion.

The first layer, the fourth layer and the sixth layer may be a single layer or multiple layers comprising polyethylene selected from the group consisting of LDPE, LLDPE, HDPE, and any mixtures thereof.

The first layer, the fourth layer and the sixth layer have thicknesses of 40-60 microns, 45-60 microns and 50-100 microns, respectively.

In the second layer, the LLDPE layer has a thickness of 15-35 microns, and the LLDPE, has a density of 0.903-0.945 g/cc, and the EAA layer has a thickness of 12-30 microns. The first layer is adhered to the LLDPE side of the second layer.

In the third layer, the metallized base film is polyester or polyethylene terephthalate subjected to metallization, such that a metal layer selected from the group consisting of aluminium, chrome, aluminium oxide, and silicon oxide is formed on the base film layer. The third layer has a thickness of 12-20 microns.

The EAA side of the second layer is adhesive-laminated with the metal side of the third layer, while the fourth layer is adhesive-laminated with the film side of the third layer.

The fifth layer comprises the following layers:
- layer A which is an extruded LLDPE layer having a thickness of 15-35 microns, wherein the LLDPE has a density of 0.903-0.945 g/cc;
- layer B which is an EAA layer having a thickness of 12-30 microns;
- layer C which is an aluminium foil layer having a thickness of 12-20 microns;
- layer D which is an EAA layer having a thickness of 12-30 microns; and
- layer F which is an extruded LLDPE layer having a thickness of 15-35 microns, wherein the LLDPE has a density of 0.903-0.945 g/cc.

The sixth layer is adhered to the LURE side of the fifth layer by a melt-LLDPE extrusion method.

In one embodiment of this invention, there is provided a tubular package formed from the laminated sheet with high specular gloss as described above for packaging food products, cosmetics, oral care products, personal care products, or pharmaceutical products.

The laminated material according to this invention possesses decorative effects due to the metallic appearance by cooperating color coating layers, so that color decorative effects can be obtained. For example, the laminated material has golden metallic luster due to the use of transparent gold color coating on the surface of the laminated sheet. Reverse image printed on the metalized polyester prior to the adhesive lamination is possible for the laminated material in order to protect the printing ink.

The following part explains this invention in details by way of examples, however this invention is not limited to these illustrative examples.

Example 1

KPL-01: Outer PE Film 45/mPET 12/PE Film 60/LLDPE 30/Tie 15/EVOH 20/Tie 15/LLDPE 30/Inner PE Film 100

A polyester film having a thickness of 12 microns subjected to metal evaporation on one side is adhesive-laminated with a polyethylene film (60 microns) and an outer polyethylene film (45 microns) by using an adhesive agent. Subsequently, this laminated film is further laminated with an inner polyethylene film (100 microns) by using extrusion lamination together with hot-melted resins of LLDPE, a tie, and ethylene vinyl alcohol.

Example 2

KPL-02: Outer PE Film 45/LLDPE 20/EAA 25/mPET 12/PE Film 50/LLDPE 30/Tie 15/EVOH 15/Tie 15/Inner PE Film 100

A metalized polyester film (12 microns) is adhesive-laminated with a polyethylene film (50 microns) by using an adhesive agent. Subsequently, this laminated film is further laminated with an outer polyethylene film (45 microns) by using co-extrusion lamination together with hot-melted resins of LLDPE and EAA. Afterward, this laminated film is then laminated with an inner polyethylene film (100 microns) by using hot-melted resins of LLDPE, tie, and EVOH.

Example 3

KPL-03: Outer PE Film 40/mPET 12/EAA 25/Foil 12/EAA 20/LLDPE 28/Inner PE Film 50

A metalized polyester film (12 microns) is adhesive-laminated with an outer polyethylene film (40 microns) by using an adhesive agent. Next, an inner polyethylene film (50 micron) is laminated with an aluminium foil (12 microns) by using extrusion lamination together with hot-melted resins of LLDPE and EAA. Afterward, the metalized polyester part is laminated with the foil part by using hot-melted EAA.

Example 4

KPL-04: Outer PE Film 45/LLDPE 20/EAA 25/mPET 12/PE Film 70/LLDPE 20/EAA 25/Foil 12/EAA 18/LLDPE 25/Inner PE Film 50

A metallized polyester (12 microns) is adhesive-laminated with a polyethylene film (70 microns) by using an adhesive agent. Subsequently, this laminated film is further laminated with an outer polyethylene film (45 microns) by using extrusion lamination together with hot-melted resins of LLDPE and EAA. Next, an inner polyethylene film (50 microns) is laminated with an aluminium foil (12 microns) by using extrusion lamination together with hot-melted resins of LLDPE and EAA. Thereafter, the metalized part is laminated with the foil part by using extrusion together with hot-melted resins of LLDPE and EAA.

The present invention provides the manufacturing process of a multilayered laminate for manufacturing a laminated tube. Firstly, a polyester film is surface-treated with chemicals prior to metalizing with aluminium vapor. During metallization process, plasma or corona treatment is necessary to achieve high bonding between the aluminuim vapor layer and polyester. Additional chemical treatment prior to the metallization can be performed in order to improve the bonding strength.

Secondly, adhesive lamination of the metalized polyester and the polyethylene film is performed by using an adhesive agent. Alternatively, the adhesive lamination on both sides of the metalized polyester and two polyethylene films can be selected depending on limitations of the manufacturing process. This adhesive-laminated film part is further used in the next steps as described in the examples.

An aluminium foil or EVOH are selected depending on barrier property requirements. The manufacturing process in this invention is performed by using conventional machines for co-extrusion blown films, adhesive lamination, and co-extrusion lamination.

Gloss, OTR and WVTR of all laminated sheets are shown in Table 1.

TABLE 1

| No. | Sample | Avg. Gloss 20° (GU) | OTR 23° C., 0% RH (cc/m$^2$ · day) | WVTR 38° C., 90% RH (cc/m$^2$ · day) |
| --- | --- | --- | --- | --- |
| 1 | KPL-01 | 1021 | 0.552 | 0.207 |
| 2 | KPL-02 | 1234 | 0.343 | 0.126 |
| 3 | KPL-03 | 1276 | 0.032 | 0.019 |
| 4 | KPL-04 | 1333 | 0.032 | 0.024 |
| 5 | KPL-ABL-05* | <100 | 0.033 | 0.038 |
| 6 | KPL-ABL-04** | <100 | 0.031 | 0.03 |

*Structure: Outer PE film 85/Adhesive/Al Foil 12/EAA 25/LLDPE 25/Inner PE film 50
**Structure: Outer PE film 100/LLDPE 18/EAA 18/Al Foil 12/EAA 34/LLDPE 18/(LLDPE/Tie/EVOH/Tie/LLDPE) 50

Gloss values are measured in order to evaluate the luster effects from the laminated tube in accordance with ASTM D2457-08 (angle 20°) using Elcometer 407L. Table 1 shows the gloss value of the laminated tube measured on the outer surface. The higher the gloss value, the shinier and more like a mirror the tube is. In general, gloss of an aluminium barrier laminate, such as a laminate structure: outer polyethylene film/EAA/Al Foil/EAA/Inner Polyethylene Film, might exhibit a gloss value of approximately 100-250 GU. In case of the metalized-polyester laminate tube, the metalized polyester film itself has a shiny effect with a gloss value of approximately >800 GU. The high gloss value of the metalized PET is reduced after several laminations such as adhesive/extrusion lamination on the front of the metalized side. Therefore, the manufacturing process is taken into consideration when appropriate overall properties of the laminated sheet are selected between high clarity and high bonding strength. The adhesive lamination process may usually give higher clarity but lower bonding strength to the laminated sheet than the extrusion lamination technique, or vice versa. Interestingly, the gloss values of all examples are in the range of 1,000-1,333 GU. There is no significant difference of the luster effects of the example sheets. Good selection of polyethylene resins and mixtures thereof are important in order to obtain high clarity for the polyethylene film on the outer side of the laminated sheet. Moreover, low haze of EAA and LLDPE resins used in the extrusion lamination will affect the total gloss value of the laminate.

Oxygen transmission rate (OTR) and water vapor transmission rate (WVTR) are determined in accordance with ASTM D3985 and ASTM F1249, respectively. The EVOH-laminated sheet has higher oxygen transmission rate (lower barrier) than the foil-laminated sheet. It is generally known by barrier properties of resins themselves. However, there are some significant changes in example 1 and 2. Example 2 with the extrusion lamination exhibits a 38% higher barrier property (lower OTR value) than example 1 with the adhesive lamination. One advantage of the extrusion lamination over the adhesive lamination is less lamination complexity. It should be noted that KPL-02 exhibits a 50% higher water-vapor barrier property than KPL-ABL-05. Moreover, KPL-03 exhibits a 20% higher water-vapor barrier improvement than KPL-ABL-04. These may be because of a water-vapor barrier property of mPET as compared with polyethylene. The laminated tube ideally suited for packaging liquid or paste products depends on overall performances for each application.

The invention claimed is:

1. A laminated sheet with high specular gloss comprising the following layers:
    a first layer which is an outer polyethylene layer;
    a second layer which is an evaporated film layer made of a metallized base film;
    a third layer which is a polyethylene layer;
    a fourth layer which is a multilayered film layer comprising at least one ethylene-vinyl alcohol copolymer layer and at least one polyethylene layer, wherein at least one layer of the ethylene-vinyl alcohol copolymer is tied to at least one layer of the said polyethylene by a tie; and
    a fifth layer which is an inner polyethylene layer,
wherein the first to fifth layers are adhered together by means of adhesion or coextrusion.

2. The laminated sheet with high specular gloss according to claim 1, wherein the first layer and the third layer may be a single layer or multiple layers comprising polyethylene selected from the group consisting of LOPE, LLDPE, HDPE, and any mixtures thereof.

3. The laminated sheet with high specular gloss according to claim 1, wherein the first layer and the third layer have thicknesses of 45-60 microns.

4. The laminated sheet with high specular gloss according to claim 1, wherein, in the second layer, the metallized base film is polyester or polyethylene terephthalate subjected to metallization, such that a metal layer selected from the group consisting of aluminium, chrome, aluminium oxide, and silicon oxide is formed on the base film layer.

5. The laminated sheet with high specular gloss according to claim 1, wherein the second layer has a thickness of 12-20 microns.

6. The laminated sheet with high specular gloss according to claim 1, wherein the first layer is adhesive-laminated with the metal side of the second layer, the third layer is adhesive-laminated with the film side of the second layer, the fifth layer is adhesive-laminated with the LLDPE side of the fourth layer and the third layer is adhesive-laminated with the LLDPE side of the fourth layer.

7. The laminated sheet with high specular gloss according to claim 1, wherein the fourth layer comprises the following layers:
    layer A which is an extruded LLDPE layer having a thickness of 15-35 microns, wherein the LLDPE has a density of 0.903-0.945 glee;
    layer B which is a tic layer having a thickness of 15-40 microns;
    layer C which is an ethylene-vinyl alcohol copolymer layer having a thickness of 10-25 microns, wherein the ethylene-vinyl alcohol copolymer has an amount of ethylene in the range of 27 to 48%;
    layer D which is a tie layer having a thickness of 15-40 microns, wherein the 20 tie selected from the group consisting of anhydride-modified, low-density polyethylene resins, and linear low-density polyethylene resins containing anhydride; and
    layer E which is an extruded LLDPE layer having a thickness of 15-35 microns, wherein the LLDPE has a density of 0.903-0.945 glee.

8. The laminated sheet with high specular gloss according to claim 1, wherein the inner polyethylene layer may be a single layer or multiple layers comprising polyethylene selected from the group consisting of LOPE, LLDPE, HDPE, and any mixtures thereof, and has a thickness of 70-120 microns.

9. A laminated sheet with high specular gloss according to claim 1, comprising a layer between the first layer and the second layer which is a film layer comprising at least one LLDPE layer and at least one EAA layer.

10. A laminated sheet with high specular gloss comprising the following layers:
    a first layer which is an outer polyethylene layer;
    a second layer which is an evaporated film layer made of a metallized base film;
    a third layer which is a layer comprising at least one EAA layer and at least one metal foil layer;
    a fourth layer which is a LLDPE layer having a thickness of 15-35 microns, and the LLDPE has a density of 0.903-0.945 glee; and
    a fifth layer which is an inner polyethylene layer,
wherein the first to fifth layers are adhered together by means of adhesion or co-extrusion.

11. The laminated sheet with high specular gloss according to claim 10, wherein the first layer and the fifth layer may be a single layer or multiple layers comprising polyethylene selected from the group consisting of LDPE, LLDPE, HDPE, and any mixtures thereof.

12. The laminated sheet with high specular gloss according to claim 10, wherein the first layer and the fifth layer have thicknesses of 45-60 microns and 50-100 microns, respectively.

13. The laminated sheet with high specular gloss according to claim 10, wherein, in the second layer, the metallized base film is polyester or polyethylene terephthalate subjected to metallization, such that a metal layer selected from the group consisting of aluminium, chrome, aluminium oxide, and silicon oxide is formed on the base film layer.

14. The laminated sheet with high specular gloss according to claim 10, wherein the second layer has a thickness of 12-20 microns.

15. The laminated sheet with high specular gloss according to claim 10, wherein the first layer is adhesive-laminated with the metal side of the second layer, the EAA side of the third layer is adhesive-laminated with the film side of the second layer, and the EAA side of the third layer is adhesive-laminated with the fourth layer.

16. The laminated sheet with high specular gloss according to claim 10, wherein the third layer comprises the following layers:
    a first layer which is an EAA layer having a thickness of 12-30 microns,
    a second layer which is an aluminium foil layer having a thickness of 12-20 microns, and
    a third layer which is an EAA layer having a thickness of 12-30 microns.

17. A laminated sheet with high specular gloss comprising the following layers:
    a first layer which is an outer polyethylene layer;
    a second layer which is a film layer comprising at least one LLDPE layer and at least one EAA layer;

a third layer which is an evaporated film layer made of a metallized base film;

a fourth layer which is a polyethylene layer;

a fifth layer which is a film layer comprising at least one LLDPE layer, at least one EAA layer, and at least one metal foil layer; and a sixth layer which is an inner polyethylene layer, wherein the first to sixth layers are adhered together by means of adhesion or co-extrusion.

18. The laminated sheet with high specular gloss according claim 17, wherein the first layer, the fourth layer and the sixth layer may be a single layer or multiple layers comprising polyethylene selected from the group consisting of LDPE, LLDPE, HDPE, and any mixtures thereof.

19. The laminated sheet with high specular gloss according to claim 17 wherein the first layer, the fourth layer and the sixth layer have thicknesses of 40-60 microns, 45-60 microns and 50-100 microns, respectively.

20. The laminated sheet with high specular gloss according to claim 17, wherein the fifth layer comprises the following layers:

layer A which is an extruded LLDPE layer having a thickness of 15-35 microns, wherein the LLDPE has a density of 0.903-0.945 g/cc;

layer B which is an EAA layer having a thickness of 12-30 microns;

layer C which is an aluminium foil layer having a thickness of 12-22 microns;

layer D which is an EAA layer having a thickness of 12-30 microns; and layer E which is an extruded LLDPE layer having a thickness of 15-35 microns, wherein the LLDPE has a density of 0.903-0.945 g/cc.

* * * * *